P. GRABLER.
FLUSH VALVE.
APPLICATION FILED NOV. 9, 1908.
1,123,123.
Patented Dec. 29, 1914.
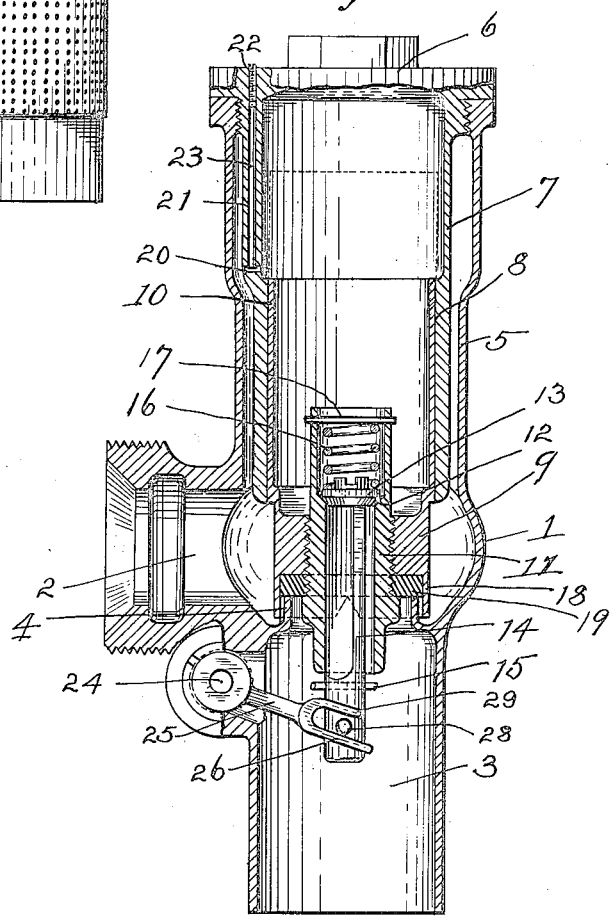
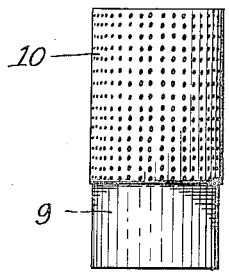
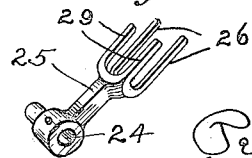
Witnesses
G. O. Farquharson
C. N. Tresch
Inventor
Peter Grabler,
by Brockett & Kevis,
Attorneys.

UNITED STATES PATENT OFFICE.

PETER GRABLER, OF CLEVELAND, OHIO, ASSIGNOR, BY DIRECT AND MESNE ASSIGNMENTS, TO THE CLEVELAND FLUSHOMETER COMPANY, OF CLEVELAND, OHIO.

FLUSH-VALVE.

1,123,123.  Specification of Letters Patent.  Patented Dec. 29, 1914.

Application filed November 9, 1908. Serial No. 461,591.

*To all whom it may concern:*

Be it known that I, PETER GRABLER, a citizen of the United States, residing at Cleveland, in the county of Cuyahoga and State of Ohio, have invented certain new and useful Improvements in Flush-Valves, of which the following is a specification.

This invention relates to improvements in flush valves generally, and particularly to that class of flush valves set forth in my pending application No. 407,336, filed Feb. 24, 1908, wherein a casing having inlet and outlet openings with a valve seat therebetween, is provided with a cylindrical portion in alinement with the valve seat and surrounding a suspended cylindrical member adapted to receive a plunger carrying a suitable valve which coöperates with the valve seat, and this present application is for the purpose of improving the device disclosed in that application, by arranging the bearing surfaces between the cylindrical member and the plunger, in a manner such that they are normally coextensive when the valve is not in use, whereby no part of either one is exposed to the collection of sediment contained in the water or the corrosive action of the water at that time.

Invention also resides in the form of valve employed to coöperate with the valve seat as well as in the arrangement of a form of relief valve, which is normally held in a closed position by a spring which in itself, aside from normally holding this relief valve tightly closed, is adapted to cause the rapid upward movement of the plunger and main valve thereby reducing the period of time consumed in the operation of the flush to a certainty.

The foregoing operation takes place by reason of the fact that when the relief valve is raised against the spring the energy stored in the spring reacts in an upward direction and forces the plunger in the same direction with a quick movement, resulting in the seating of the relief valve. It is to be understood, however, that this operation takes place while the operating lever is still in engagement with the relief valve. By the use of the spring described, the plunger moves up quietly and the period of time is therefore more certain.

The invention further resides in the construction and combination of parts hereinafter set forth in the following description, drawings and claims.

Referring to the drawings, Figure 1 represents a vertical sectional view of my improved flush valve; Fig. 2 an elevation of the plunger and Fig. 3 a detail view of the operating lever.

In carrying out my invention, any preferred form and construction of parts may be employed, providing they possess the necessary characteristics, but I have shown one form which meets the requirements with great efficiency, and in such embodiment, 1 represents the casing provided with an inlet opening 2, a discharge opening 3, a valve seat 4 between such openings, and a cylindrical portion 5 in alinement with the valve seat. A plug 6 is arranged preferably in the upper part of the cylindrical portion 5, and it is provided with a cylindrical member 7 projecting well into the cylindrical portion 5 and provided with an inwardly projecting bearing surface 8. Slidably mounted within the cylindrical member 7 is a plunger 9, which has a bearing surface portion 10 co-extensive with and engaging the bearing surface 8, and preferably provided with a plurality of circumferentially isolated pockets therein. This plunger 9 carries a tubular member 11 threaded into it and having a relief valve seat 12 coöperating with a relief valve 13 provided with a stem 14 projecting out through the lower end and limited in its movement by a stop pin 15. A spring 16 is arranged above the valve 13 and is held in engagement therewith by a retaining pin 17 passing across the opening in the tubular member and extending through the walls thereof. The lower end of the plunger 9 is provided with an annular sleeve portion 18 slightly larger than the valve seat 4 and telescoping onto it and arranged to receive a gasket 19 which is adapted to engage the valve seat 4.

The cylindrical member 7 is further provided with a port 20 through the wall thereof and establishing communication between the openings in the same and the cylindrical portion of the casing whereby the water pressure may be equalized above and below the plunger, and further with an opening 21 arranged to cut the port 20 and threaded at its upper end so that a screw 22 with a long shank 23 may be adjusted in a manner to regulate the flow through said port. Suitable mechanism is also provided for operating the valve and it comprises an operating shaft 24 entering the casing and having secured thereto and within the casing, an operating lever 25 having a bifurcated end portion for receiving the stem of the relief valve. Each side portion of the bifurcated end portion is in the form of a fork comprising a lower long finger 26 for engagement below a pin 28 carried by the stem 14 and an upper short finger 29 for engagement above the pin 28. By this arrangement the short fingers 29 will permit the assembling of the device when the lever 25 is shifted into its uppermost position and when the operating device, not shown, is manipulated the relief valve and plunger are raised also. It is quite obvious that by this construction the relief valve, and hence the flush, is at all times under the control of the operator or in other words the flush may be closed automatically or it may be closed manually by the operator.

From the foregoing description, it will be seen that the bearing surface of the cylindrical member and of the plunger are both in engagement throughout their entire extent during the period when the flush is not in operation or it might be said under normal condition so that the collection of sediment or corrosive substances upon exposed surfaces may not affect the operation of the flush. It will also be readily seen that when the relief valve is operated to release the pressure within the cylindrical member and plunger, the tension of the spring will cause this plunger to move upward very rapidly until the release valve is seated, then the closing operation begins, and the period of time consumed in this operation is not only the same at all times at a given pressure, but rendered absolutely certain.

By the use of a telescoping construction between the main valve and valve seat, the knocking, or vibration, or hammering caused by the rush of water between the plunger sleeve and the valve sleeve is obviated and it has been found in practice that this construction just referred to, actually does prevent the hammering or knocking which is very undesirable in a valve of this type.

Having described my invention, I claim:—

1. In a flush valve, a casing having an inlet opening and an outlet opening, a valve seat within said casing and between such openings, a main valve coöperating with said seat, a cylindrical member carried by said casing and having an internal bearing portion and another portion of larger diameter beyond the bearing portion, a plunger carried by said main valve and having a bearing portion equal in extent to that of the bearing portion of said cylindrical member, said bearing portions being coextensive and registering throughout their entire length when the valve is closed, a relief valve for relieving the pressure above the plunger, and means for operating said relief valve.

2. In a flush valve, a casing having inlet and outlet openings and a cylindrical portion, a valve seat within said casing between said openings and arranged in alinement with the cylindrical portion of the casing, a plug secured in said cylindrical portion and having a cylindrical member projecting into said cylindrical portion of the casing, said cylindrical member having a bearing portion and another portion of larger diameter, a plunger, a main valve carried thereby and coöperating with said valve seat, a bearing portion carried by said plunger and equal in extent to the bearing portion of said cylindrical member, both of said bearing portions registering throughout their entire length when the valve is in normal or closed position, a relief valve for relieving the pressure above said plunger, and means for raising the relief valve.

In testimony whereof I affix my signature in presence of two witnesses.

PETER GRABLER.

Witnesses:
ALTON H. BEMIS,
B. W. BROCKETT.